United States Patent
Chen et al.

(10) Patent No.: US 9,250,975 B2
(45) Date of Patent: *Feb. 2, 2016

(54) ELASTIC AND SCALABLE PUBLISH/SUBSCRIBE SERVICE

(75) Inventors: Han Chen, White Plains, NY (US); Minkyong Kim, Scarsdale, NY (US); Hui Lei, Scarsdale, NY (US); Ming Li, Elmsford, NY (US); Fan Ye, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1208 days.

This patent is subject to a terminal disclaimer.

(21) Appl. No.: 13/014,501

(22) Filed: Jan. 26, 2011

(65) Prior Publication Data

US 2012/0191856 A1 Jul. 26, 2012

(51) Int. Cl.
G06F 15/16 (2006.01)
G06F 9/50 (2006.01)
H04L 29/08 (2006.01)

(52) U.S. Cl.
CPC .............. G06F 9/5083 (2013.01); H04L 67/26 (2013.01); H04L 67/1008 (2013.01); H04L 67/18 (2013.01)

(58) Field of Classification Search
CPC ....... H04L 65/403; H04L 67/22; H04L 67/10; G06Q 50/01; H04W 4/02
See application file for complete search history.

(56) References Cited

U.S. PATENT DOCUMENTS

2003/0208539 A1* 11/2003 Gildenblat et al. ........... 709/205
2004/0181588 A1* 9/2004 Wang et al. .................. 709/207
2006/0059567 A1* 3/2006 Bird et al. ...................... 726/27
2008/0294644 A1* 11/2008 Liu et al. ....................... 707/10
2009/0112846 A1* 4/2009 Vee et al. ........................ 707/5
2011/0208559 A1* 8/2011 Fontoura et al. ............ 705/7.26

OTHER PUBLICATIONS

Montresor, Alberto. "Gossip Protocols for Large-Scale Distributed Systems." <Downloaded from http://sbrc2010.inf.ufrgs.br/resources/presentations/tutorial/tutorial-montresor.pdf>. Oct. 23, 2006.*
Goswami et al., "Dynamic Load-Sharing using Predicted Process Resource Requirements." Jul. 1990.*
Baldoni, R., et al., "Modelling Publish/Subscribe Communication Systems: Toward a Formal Approach", Proceedings of the Eighth IEEE International Workshop, Jan. 2003, pp. 1-8.
Guo, X., et al., "A New Approach for Overload Management in Content-Based Publish/Subscribe", International Conference on Software Engineering Advances, Aug. 2007, (6 pages).
Parzyjegla. H., et al., "Reconfiguring Publish/Subscribe Overlay Topologies", Proceedings of the 26th IEEE International Conference on Distributed Computing Systems Workshops, Jul. 2006, (6 pages).
Zheng, X., et al., "PAT: A P2P Based Publish/Subscribe System for QoS Information Dissemination of Web Services", 2009 IEEE International Conference on Web Services, Oct. 2009, pp. 839-846.
Chen, H., et al. "Final Office Action for U.S. Appl. No. 13/613,183— Entitled: Elastic and Scalable Publish/Subscribe Service" Jul. 2013. (17 Pages).

* cited by examiner

Primary Examiner — Scott B Christensen
(74) Attorney, Agent, or Firm — Tutunjian & Bitetto, P.C.; Preston J. Young

(57) ABSTRACT

A system and method are disclosed for an elastic and scalable publish/subscribe scheme. Subscription information is received at a dispatcher node. A plurality of matching nodes are selected in an overlay network to store the subscription information on a computer readable storage medium. Upon receiving an event at a dispatching node, at least one of the matching nodes with the stored subscription information is selected to process the event.

11 Claims, 6 Drawing Sheets

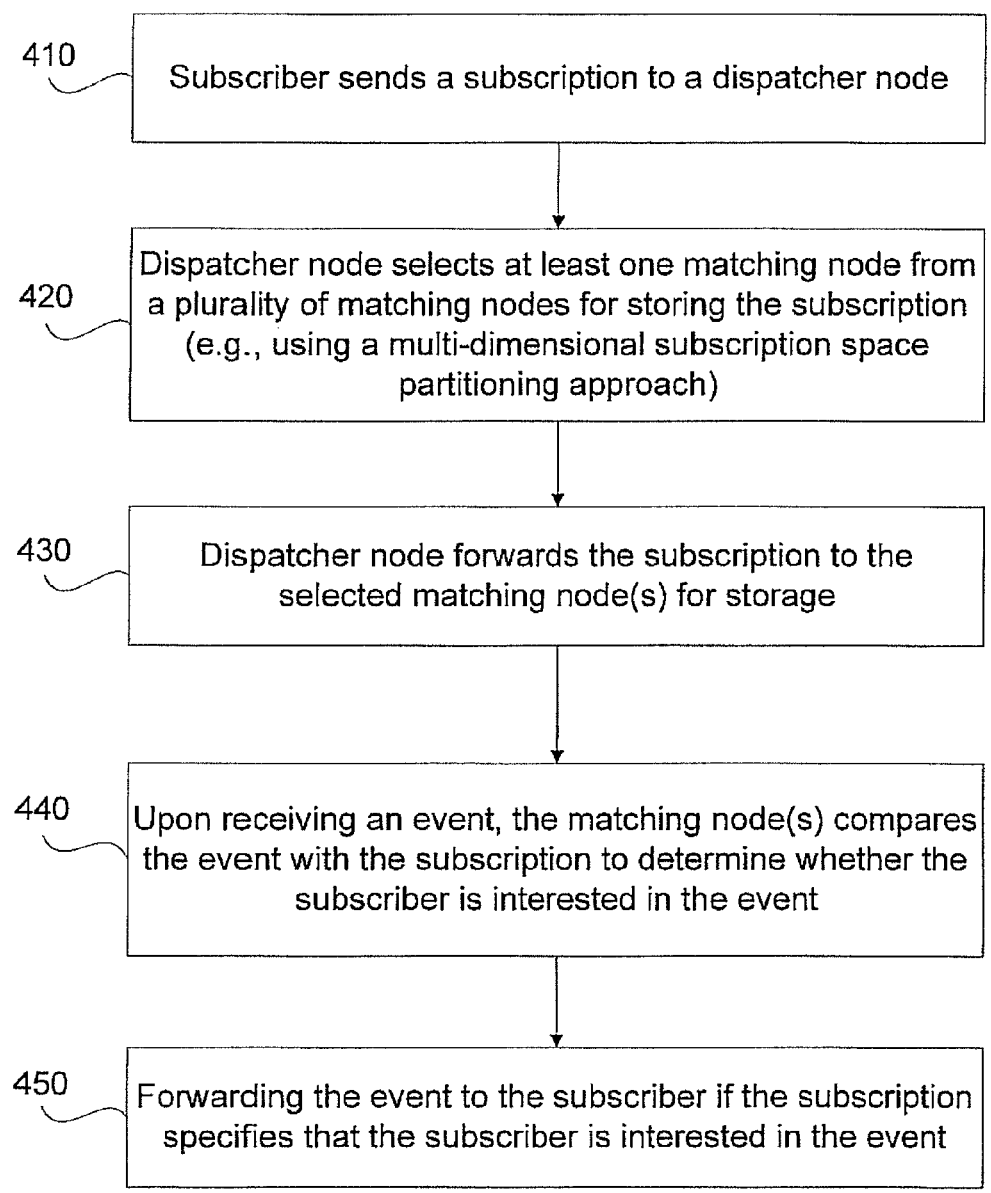

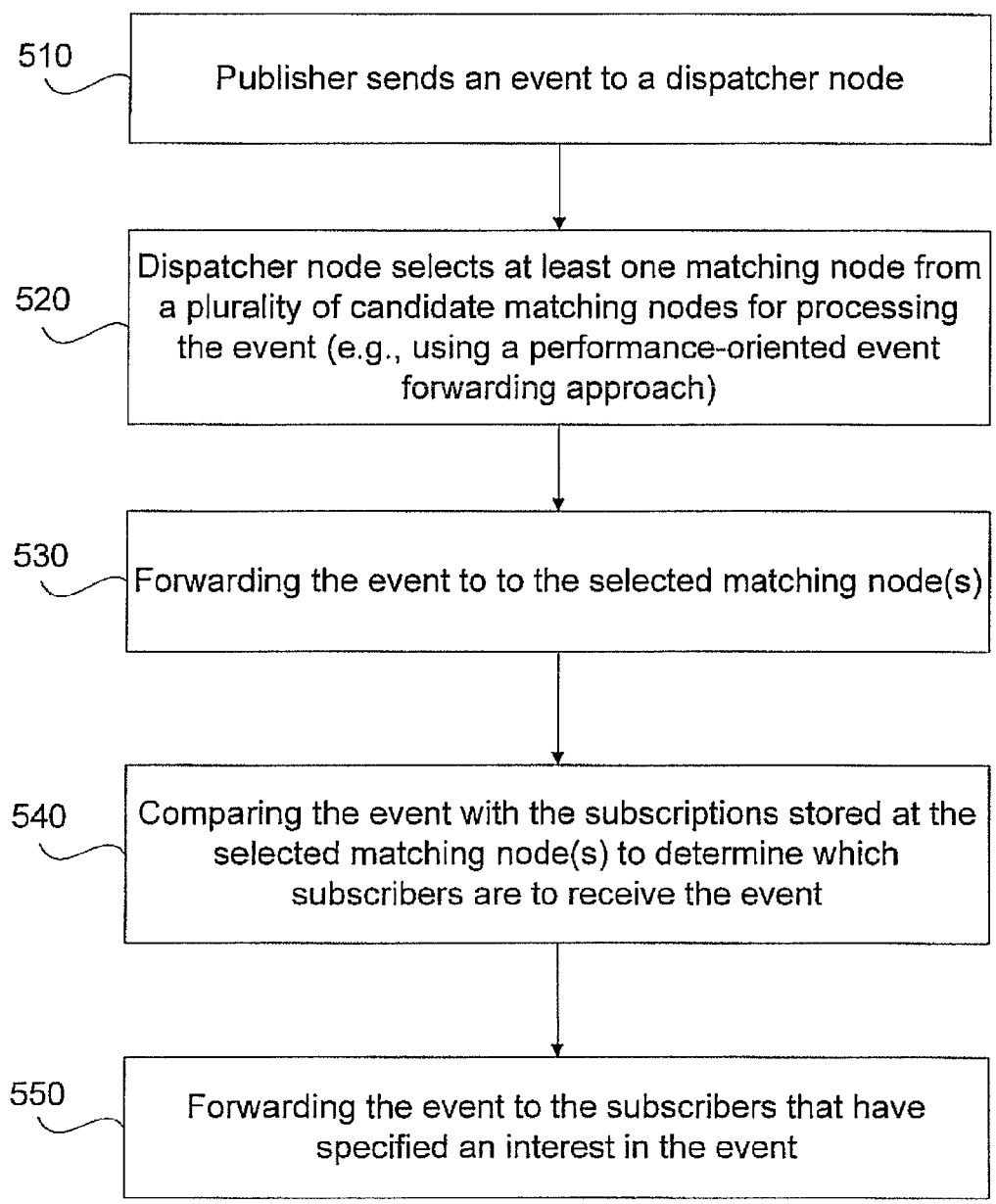

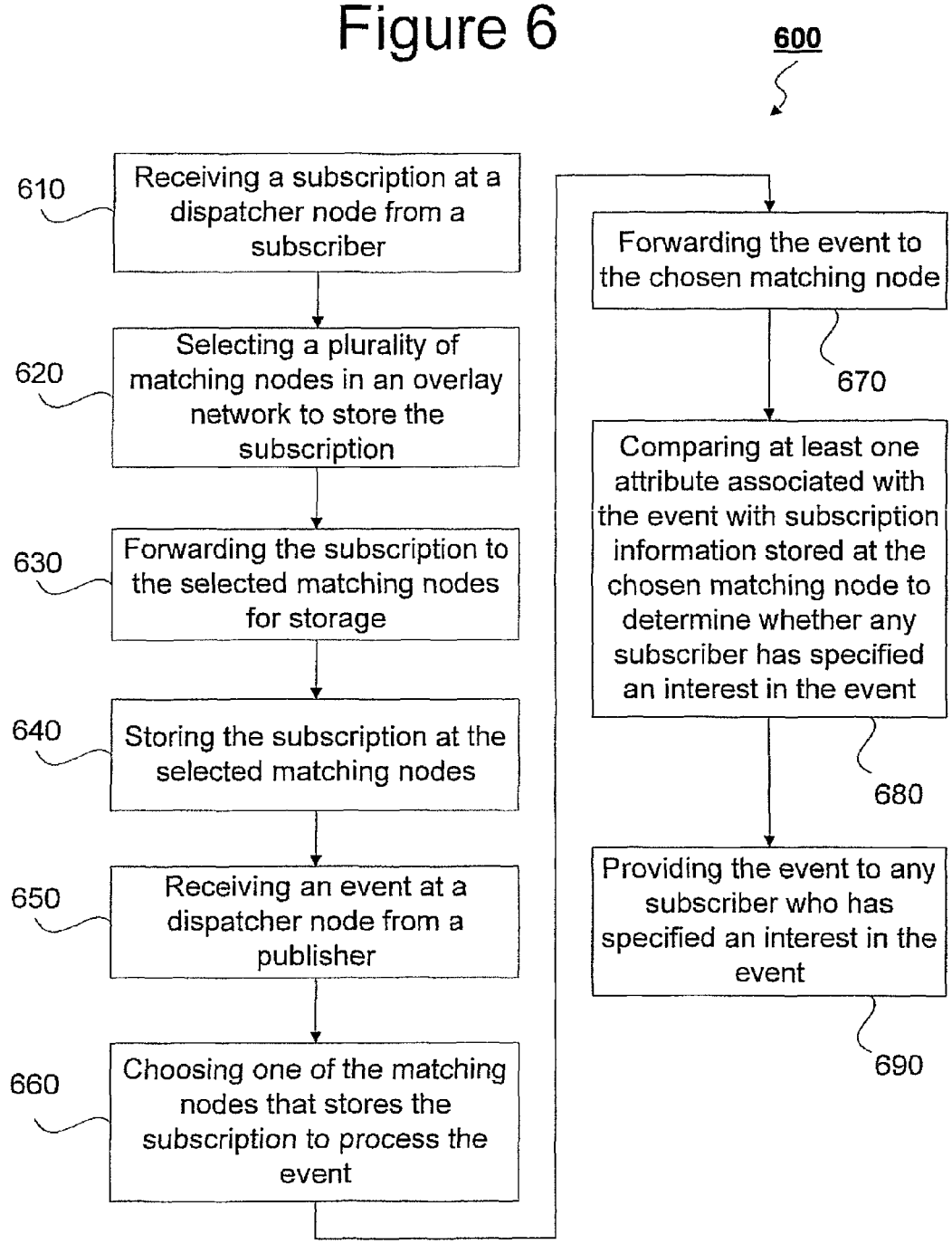

ELASTIC AND SCALABLE PUBLISH/SUBSCRIBE SERVICE

BACKGROUND

1. Technical Field

The present invention relates to an asynchronous messaging paradigm, and more particularly, to an attribute-based publish/subscribe paradigm which quickly scales in accordance with the number of consumers and producers.

2. Description of the Related Art

Publish/subscribe (pub/sub) schemes employ an asynchronous communication pattern for communication among application components. Publishers and subscribers of messages are decoupled from each other and interact through an intermediary—i.e., a pub/sub system. A subscriber registers its interest in certain kinds of messages with the pub/sub system in the form of a subscription. Publishers post messages to the pub/sub system. The system matches messages (e.g., publications) to subscriptions and delivers messages to interested subscribers.

Conventional pub/sub systems are based on either a centralized model or a peer-to-peer model. With the centralized model, publishers and subscribers select a single server and directly connect to that server. A centralized pub/sub system does not provide for adequate scaling because they are configured as a full mesh topology in which subscriptions and events are replicated on each server. Moreover, these centralized systems require heavy administration to handle highly dynamic workloads, and only provide limited tolerance in the case of a data center failure.

In the peer-to-peer model, the publishers and subscribers serve as the pub/sub servers. Each node is responsible for a particular subset of subscriptions and events. As a result, heavily loaded servers exist due to uneven distribution of subscriptions and events. While load balancing mechanisms may be implemented to provide a more even distribution, such load balancing mechanisms tend to be very complex and result in other performance penalties.

Neither the centralized model, nor the peer-to-peer model, is suited to handle constraints imposed by recent trends associated with cloud computing and sense-and-response applications. Sense-and-respond applications relate to applications which adapt their behavior to events in either the cyber world or real world, based on continuous readings from potentially large numbers of physical or logical sensors. Cloud computing typically involves a computing environment in which shared resources, software or information is provided to computers or other devices on-demand over the Internet. Conventional pub/sub systems are not configured to meet the requirements imposed by cloud computing and sense- and response applications.

SUMMARY

In accordance with the present principles, a method is disclosed for an elastic and scalable publish/subscribe system. Subscription information is received at a dispatcher node. A plurality of matching nodes are selected in an overlay network to store the subscription information on a computer readable storage medium. Upon receiving an event at a dispatching node, at least one of the matching nodes with the stored subscription information is selected to process the event.

In accordance with the present principles, a system is disclosed for an elastic and scalable publish/subscribe system. The system includes a plurality of matching nodes forming an overlay network, wherein the matching nodes are configured to match events to subscription information stored on a computer-readable storage medium at the matching nodes. The system further includes at least one dispatcher node configured to forward subscription information and events received at the at least one dispatcher node to at least one of the matching nodes in a single hop.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 4 is a block/flow diagram illustrating an exemplary method for processing a subscription.

FIG. 5 is a block/flow diagram illustrating an exemplary method for processing an event.

FIG. 6 is a block/flow diagram illustrating an exemplary method for operating a publish/subscribe messaging system in accordance with the present principles.

DETAILED DESCRIPTION OF PREFERRED EMBODIMENTS

Figure 1:
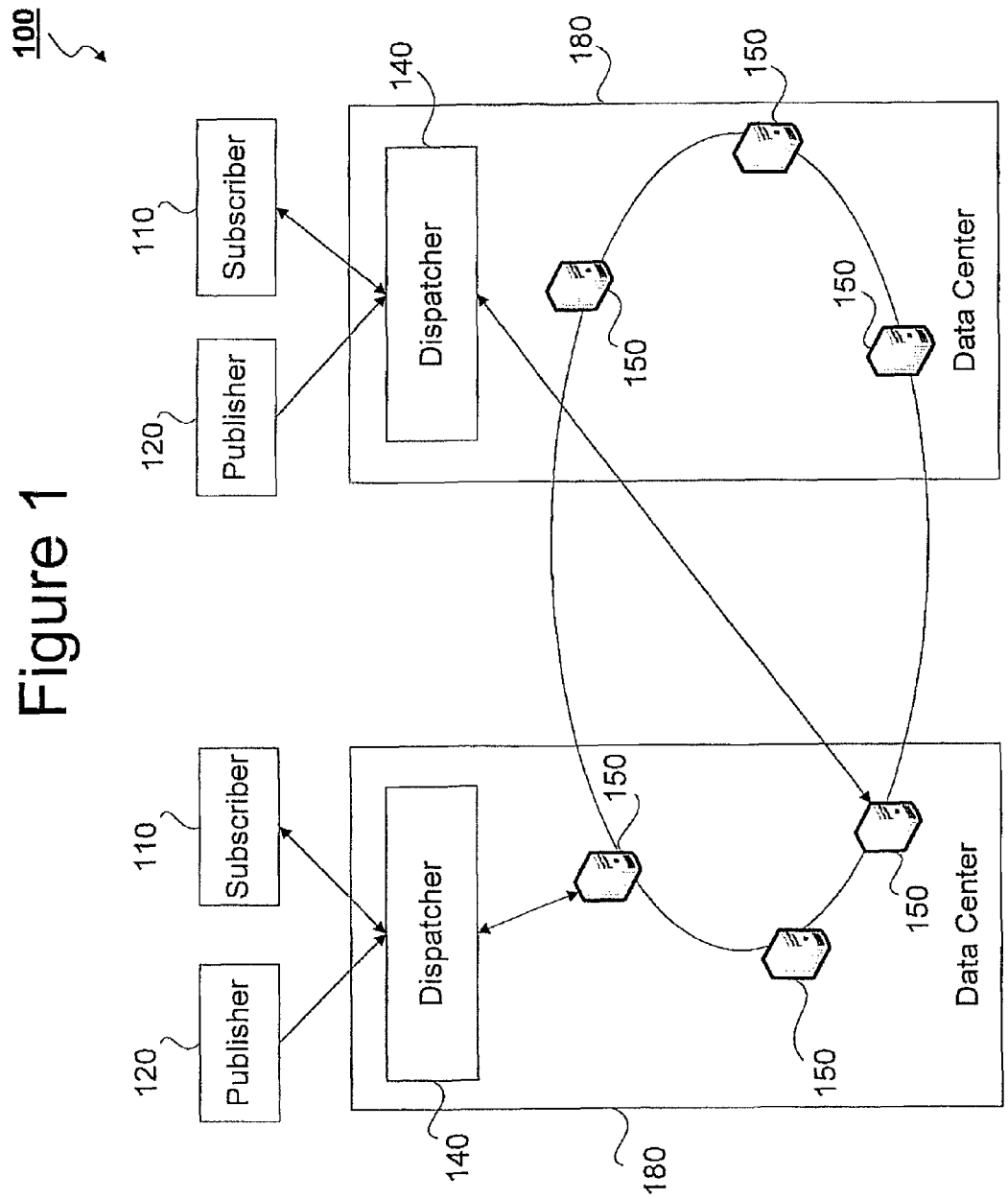
FIG. 1 is a block/flow diagram illustrating an exemplary publish/subscribe messaging system in accordance with the present principles.

In accordance with the present principles, a two-tier attributed-based publish/subscribe (pub/sub) system is disclosed which can handle large amounts of data from sense-and-respond applications and which is optimized for implementation in a cloud environment. The pub/sub system disclosed herein includes two tiers of nodes, dispatcher nodes and matching nodes, organized into a one-hop overlay network.

In the first tier, dispatcher nodes receive events from the publishers and subscription information from subscribers. The dispatcher nodes select at least one of the matching nodes in the second tier to receive and process the data originating from subscribers and publishers. More specifically, the dispatcher node determines which matching nodes are to store the subscription information provided by the subscribers, and which matching nodes are to receive the events provided by a publisher for matching against the subscriptions. The data provided by the subscribers and publishers traverses a single hop at most from a dispatcher node to a matching node before being matched. In this one-hop overlay configuration, the dispatcher nodes serve as an intermediary between the matching nodes and the clients (i.e., the publishers and subscribers).

The matching nodes are responsible for matching published events against the subscription information specified by the subscribers, and determining which subscribers are to receive each of the published events. Based on the matching results, events may be forwarded to subscribers by either a dispatcher node or a matching node.

Each node in this one-hop overlay network knows the liveliness (e.g., whether a node has failed or is available) and contact information (e.g., IP address or port) of all the other nodes in the network. This can be implemented using a gossiping protocol according to which each node periodically exchanges information with a few randomly selected nodes. The gossiping protocol propagates a state change throughout the entire network within a predetermined number of iterations.

Many emerging "smart applications" or "smart systems" are currently being developed which require publish/subscribe systems that can handle enormous amounts of data originating from large numbers of publishers and subscribers that are distributed throughout large geographical areas. For example, a smart transportation application may provide real time traffic information for drivers using sensors (e.g., cameras, cell phones, loop detectors, etc.) that publish traffic data in real time, or a smart healthcare application may provide for patient monitoring using sensors to monitor a patients heartbeat, breathing or other bodily function. Other examples may include a smart application that is employed to conserve energy consumption in a building (e.g., using sensors to monitor temperature distribution in a building and to control air conditioning and/or heating units based on this information), or a smart power grid application which monitors and controls power distribution over a large geographic based on sensors which provide information such as power demand, price, power capacity, etc.

With these smart applications, the publishers may represent sense-and-response devices, such as mobile devices, cameras or other sensors, which continuously generate large amounts of data in real time. The subscribers may represent people, devices or information technology (IT) systems, which usually have quite specific interests in the types of data they want to receive. Conventional publish/subscribe systems, based on either the centralized or peer-to-peer models, are not suited to handle the large population of subscribers and publishers, the large volume of data, or the continuously changing interests of subscribers associated with these smart applications and systems.

However, the publish/subscribe paradigm disclosed herein is able to satisfy the heavy demands imposed by these smart applications by providing a system which quickly scales to potentially millions of publishers and subscribers, which supports accurate content filtering, and which provides the elasticity to quickly adapt to dramatic changes in the client population, data amount and/or subscriber interests.

The publish/subscribe model disclosed herein is able to handle the heavy demands imposed by these smart applications for several reasons. These include the following. Clients are not directly coupled to a single, fixed publish/subscribe server. Rather, the system selects the servers which are to receive the subscriptions and events. This results in a more elastic system which is readily available to clients. In addition, the present publish/subscribe system concurrently assigns subscriptions and events to a plurality of attributes stored on the pub/sub servers, thus preventing servers from becoming too heavily loaded using any single attribute. Moreover, assigning data to attributes in this manner permits the system to scale easily and quickly in accordance with current demands imposed by publishers and subscribers.

Further advantages stem from the fact that the present system is configured to provide "performance-aware" event forwarding to select the server with the best performance for handing a particular event. Optimizing the selection of servers in this manner provides for better load balancing between servers and improves overall performance of the system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to the drawings in which like numerals represent the same or similar elements and initially to FIG. 1, a block/flow diagram illustratively depicts a publisher/subscriber (pub/sub) messaging system 100 in accordance with the present principles. As shown therein, subscribers 110 and publishers 120 are in communication with, and transmit data to, the dispatcher nodes 140.

A publisher may represent a person, computing device, application (e.g., sense-and-response application), sensor, organization or other entity that posts an event to the publish/subscribe system 100. The terms "event" and "message", which are used interchangeably herein, refer to any sort of data (e.g., text, images, messages, videos, publications, etc.) which is provided to the publish/subscribe system 100 from a publisher 120. Events may be viewed by any subscriber 110 who has specified an interest in such events. Events may be annotated with attributes or metadata which describe the contents, topic, or subject of the events.

A subscriber 110 may represent a person, computing device, application, organization or other entity which views events posted to the publish/subscribe system 100. Subscribers 110 transmit subscription information which indicates the particular types of messages or events that the subscriber 110 would like to receive from the publish/subscribe system 100. The subscription information may directly identify events to be provided to the subscriber 110. Alternatively, subscription information may be expressed indirectly as a query on a database, or as a predicate on the attributes or content of an event.

For example, subscription information for a traffic congestion publish/subscribe application may be expressed as $[-41 \leq \text{long} < -42] \wedge [70 \leq \text{lat} < 74] \wedge [0 \leq s < 25]$, where "long" refers to longitude, "lat" refers to latitude, and "s" refers to speed. This exemplary query may be translated into a subscription which indicates that the driver wants to receive messages where vehicle speed is in the range of 0-25 miles per hour, and vehicle location is in a rectangular area within a longitudinal range of $-41°$ to $-42°$ and latitudinal range of $-70°$ to $-74°$.

The publish/subscribe system 100 includes a plurality of data centers 180 which comprise both dispatcher nodes 140 and matching nodes 150. The dispatcher nodes 140 and matching nodes 150 may represent computing servers, or may be implemented as software modules. The dispatcher nodes 140 forward the data (i.e., the events and subscription information) from the publishers and subscribers to one or more of the matching nodes 150. The matching nodes 150 execute a matching procedure to determine which events are to be transmitted to subscribers 110. In preferred embodiments, the pub/sub system 100 is an attribute-based pub/sub system. Thus, the matching procedure executed by the matching nodes 150 may involve comparing the metadata or attributes associated with an event to the subscription information provided by the subscribers 110 to determine which events are to be sent to each of the subscribers 110.

Once it is determined that a subscriber 110 is to receive a particular event, the event is forwarded to the subscriber 110. The delivery of messages to subscribers can be direct or indirect. A matching node 150 can send messages directly to matching subscribers 110 who listen and wait for incoming connections or messages. Otherwise, messages can be delivered indirectly.

In the indirect approach, a dispatcher node 140 returns a handle to some temporary storage (e.g., a message queue) after receiving subscription information from a subscriber 110. The subscriber 110 periodically polls the storage device at the dispatching node 140 to retrieve matching messages. Thus, the matching nodes 150 only deliver messages to the temporary storage of the dispatching node 140. This delivery model is suitable for subscribers 110 that employ mobile devices (e.g., cell phones, laptops, personal digital assistants, etc.) which may not be able to listen and wait for incoming messages.

It should be understood that the system 100 in FIG. 1 can be altered in a variety of different ways while staying within the scope of the present principles. For example, the number of data centers 180 may be varied, as well as the number of dispatching nodes 140 and matching nodes 150 at each data center 180. Likewise, the number of subscribers 110 and publishers 120 that communicate with each dispatching node 140 may also be varied. In addition, although the dispatching nodes 140 are depicted as separate and distinct server devices from the matching nodes 140, in certain embodiments the dispatching nodes 140 and matching nodes 150 may comprise software components which are stored on a single server.

Figure 2:
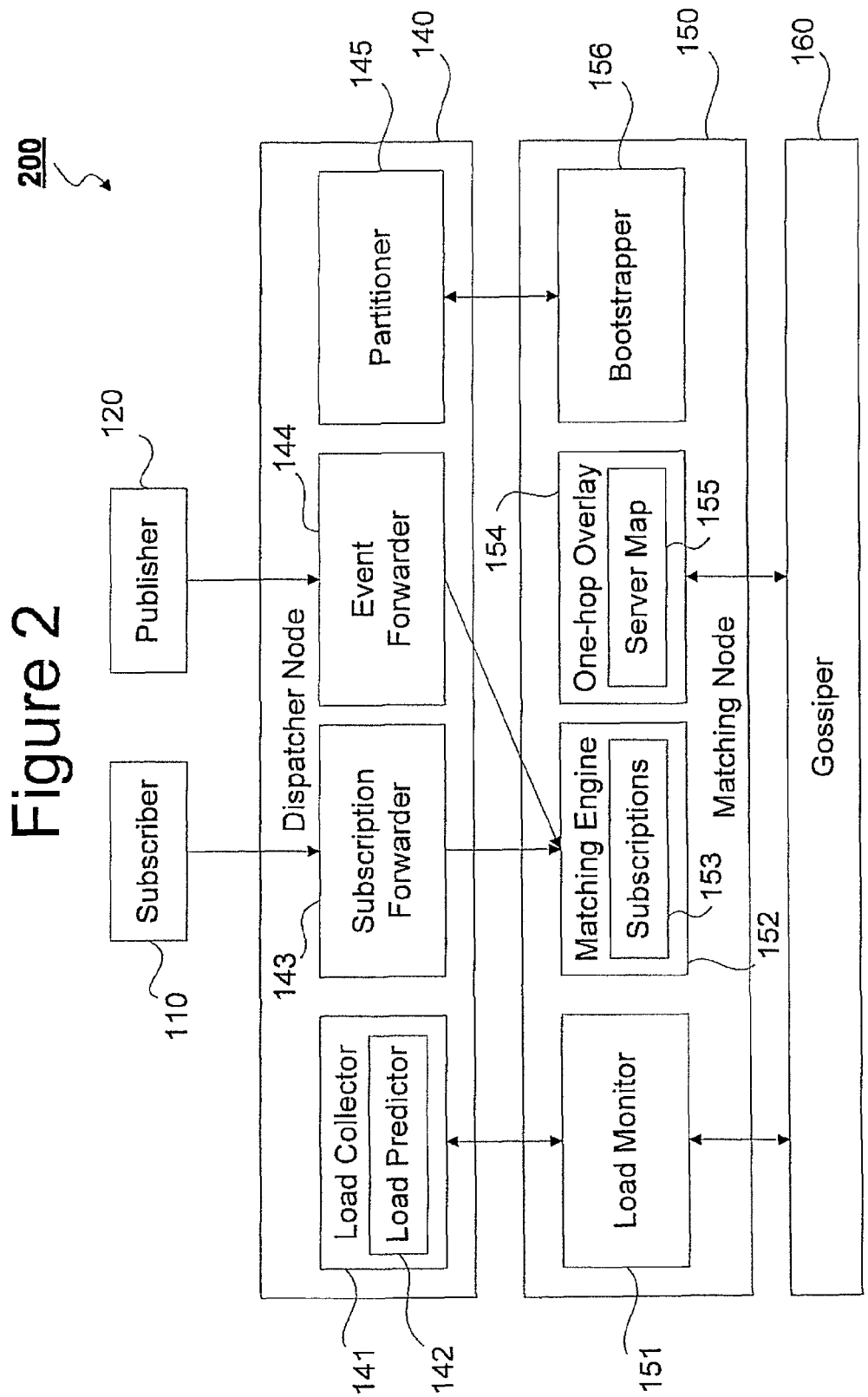
FIG. 2 is a block/flow diagram illustrating a more detailed view of the publish/subscribe messaging system of FIG. 1.

Moving on to FIG. 2, a block/flow diagram provides a more detailed description of an illustrative publish/subscribe system 200 in accordance with the present principles. A dispatcher node 140 includes a load collector 141 which periodically pulls information from the load monitors 151 on each of the matching nodes 150. The information provided by the load monitor 151 can be used to track the current load on a matching node 150. For example, the information may indicate the number of subscriptions stored on a matching node 150, the size or number of events which are queued at a particular matching node 150 for processing at a later time, the availability of resources (e.g., processor or memory) at a matching node, and/or other similarly related data. By pulling this information from each of the nodes, the load collector 141 permits the dispatching node 140 to identify and determine the loads on each of the matching nodes 150.

The load collector 141 may include a load predictor 142. The load predictor 142 can be used to predict the response times for each of the matching node(s) 150. For example, the load predictor may predict the total time that it will take for a matching node 150 to process a particular event (i.e., the time from when an event is forwarded to matching node to the time that the event is forwarded to subscribers that have specified an interest in the event). The load predictor 142 can make this prediction using the information that was pulled from the load monitors 151 at the matching nodes 150.

The dispatcher node 140 also includes a subscription forwarder 143 which receives subscription information from a subscriber 110 and selects one or more matching nodes 150 for storing the subscription information. The decision as to where the subscription information is to be stored may be based, at least in part, on the information gather by the load collector 141. In preferred embodiments, the subscription forwarder 143 employs a "multi-dimensional subscription space partitioning" technique to select the matching nodes 150 that will store the subscription information.

This technique divides the entire subscription space among the matching nodes 150 such that each matching node 150 only handles a small subset of all of the subscriptions, thus reducing the number of subscriptions that a matching node has to search through. When a subscription includes several attributes (also referred herein as "dimensions"), each attribute is partitioned into a plurality of sections, and a single server is responsible for a particular section or range of each dimension. Hence, each subscription is assigned to a plurality of matching nodes 150 such that for each event received from a publisher 120, multiple candidate matching nodes 150 exist which can finish the matching process without involving other matching nodes 150.

The above subscription space partitioning technique implicitly replicates subscriptions across multiple servers, and provides a high probability that at least two servers are in different data centers. This provides for a naturally resilient system which can endure even despite failures of entire data centers. However, to ensure resiliency of data, additional measures may be included to ensure that data is replicated across at least two data centers.

Figure 3:
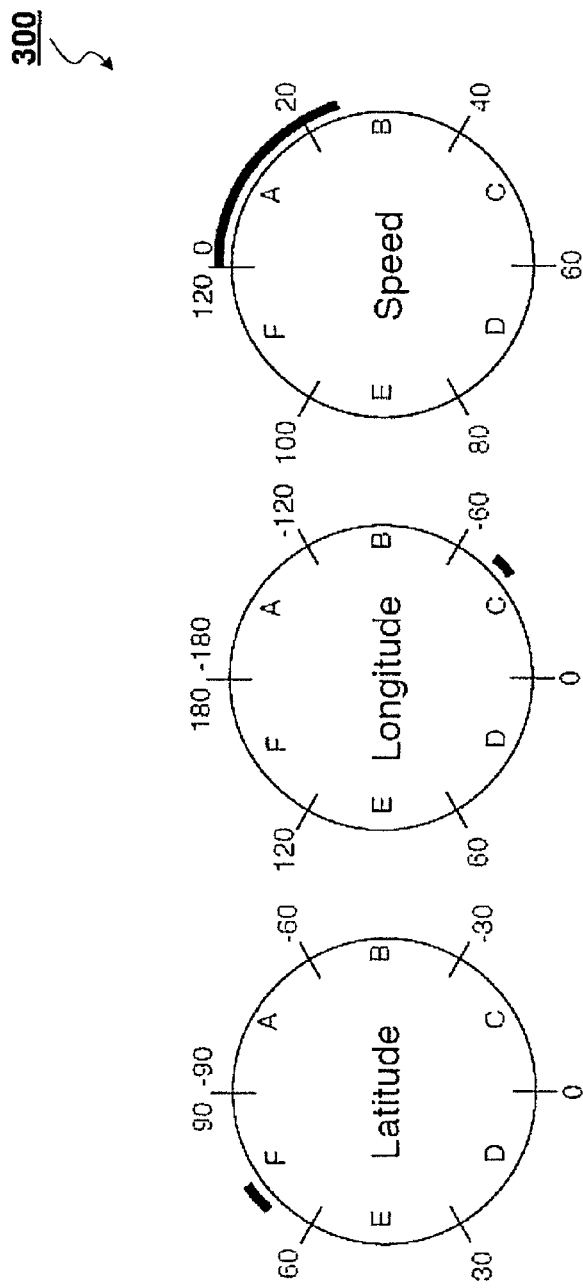
FIG. 3 is a diagram illustrating an exemplary manner for assigning a multi-attribute subscription to a plurality of matching servers using a multi-dimensional subscription space partitioning technique.

FIG. 3 is a diagram 300 illustrating how the multi-dimensional subscription space partitioning approach described above can be applied to subscription information originating from a traffic monitoring application. As shown therein, the data from the application comprises three dimensions or attributes, i.e., longitude, latitude and speed. Each of the three searchable dimensions are split into six segments and each segment is associated with one of the matching nodes labeled A-F. Since all segments along each dimension cover the whole possible value space, a predicate range in the subscription information has to overlap with at least one segment and the subscription information is assigned to at least one matching node in each dimension.

In this example, the value of the longitude attribute is in the range of −41° to −42°, the value of the latitude attribute is in the range of 70°-74°, and the value of the speed attribute is in the range of 0-25 mile per hour. Thus, the subscription is assigned to matching node F based on the latitude attribute, matching node C based on the longitude attribute, and matching nodes A and B based on the speed attribute. Each of these matching nodes stores the entirety of the subscription and has the ability to match the subscription with an incoming event without the assistance of the other matching nodes.

Real world data distribution is rarely uniform. The popular "20-80" rule states that 80% of events come from 20% of causes. Similar skewness is expected in the distribution of predicate ranges along some dimensions in a publish/subscribe system. Hence, some matching nodes 150 are assigned disproportionately more or less subscriptions along these dimensions (which may be referred to as "hot spots" or "cold spots" respectively), and, as a result, these matching nodes need to search through a significantly increased or decreased number of subscriptions than the average matching node.

The multi-dimensional subscription space partitioning approach can eliminate or mitigate the above problems associated with data skewness. Since k candidate matchers exist for each message along k dimensions, it is unlikely that every candidate is on the corresponding dimension's "hot spots". In fact, there is a higher probability that some of them will be on "cold spots". The present publish/subscribe system actively chooses matching nodes 150 which are located on "cold spots" to improve the performance of the system.

In addition to the advantages described above, the multi-dimensional subscription space partitioning technique is beneficial because the technique permits multiple indexes to be maintained throughout the system at very low cost. Moreover, the technique provides a large amount of freedom to the event forwarder 144 when determining where to forward events received from publishers 120.

Returning to FIG. 2, the dispatcher node 140 also includes an event forwarder 144. The event forwarder 144 receives events from publishers 120 and selects at least one matching node 150 which will be responsible for matching the event to the subscription information stored at the matching nodes 150. The event forwarder 144 may initially determine a subset of candidates nodes for receiving an event based on the attribute values of the event.

For example, given an incoming event, a dispatcher node 140 can find which attribute segments include the attribute values of the event. From the segment assignment information which is gossiped and known by all dispatcher nodes 140, the dispatcher nodes 140 can determine the matching nodes 150 which are responsible for those attribute segments. Then, the matching nodes 150 which are responsible for storing the subscriptions that have attribute value ranges overlapping with the attribute segments are identified as candidates for processing the event.

Hence, an event may have multiple attributes associated with it, and each attribute can be assigned to a plurality of matching nodes 150 which are each responsible for a value range associated with each attribute. Because each of these candidate matching node 150 stores subscriptions in their entirety, each of the matching nodes 150 can determine which subscriptions match an incoming event. Using the above example with reference to FIG. 3, an event of (40, −20, 35)

would have candidate matchers E, C, B since these matching nodes are responsible for segments (30, 60), (−60, 0) and (20, 40), respectively.

In preferred embodiments, the event forwarder 144 employs a "performance oriented event forwarding" technique to select at least one of the candidate matching nodes 150 to receive a given event. This technique ensures that an event is sent to the least loaded candidate server for processing, thus providing low latency and high throughput. The selection of a candidate node may be based on information gathered from the load collector 141 and/or predictions made by the load predictor 142. For example, this information may be used to select the matching node 150 with the least number of subscriptions, or with the lowest average response time. However, in preferred embodiments, the event forwarder 144 selects the matching node 150 with the lowest predicted response time (i.e., the time between when an event is received by a matching node and the time when the event is forwarded to the subscribers). This prediction accounts for the duration that an event will be queued at the matching node 150 (the more events in the queue, the longer the response time will be), and the time it takes to match events to corresponding subscriptions (the more selective the matching criteria is, the lower the matching time).

An event which is forwarded to a selected matching node 150 is processed by the matching engine 152 to determine which subscribers 110 are to receive the event. This may be performed using the subscription information stored in a subscription database 153 at the matching node 150. The subscription information stored in the subscription database 153 includes any subscription information which was forwarded to the matching node by the subscription forwarders 143. This information may comprise queries, or other data which indicates the events that a subscriber wishes to receive, for a plurality of subscribers 110. Upon identifying the subscribers 110 that are to receive a given event, the event may be forwarded to the subscribers 110 using one of the direct or indirect approaches described above.

The partitioner 145 is used by the dispatcher nodes 140 to add or remove nodes from the network. The decision to add or remove nodes from the network may be based on information gathered by the load collector 141 or data propagated through the network via the gossiper 160. For example, additional matching nodes 150 may be added if the load collector 141 determines that the load on a matching node 150 is too great, and that it would be better to split the load with another newly added matching node 150. In this case, each of its segments assigned to the matching node 150 may be divided into two smaller segments, and one half of these segments may be assigned a newly joining matching node 150. Similarly, the partitioner 145 may be responsible for removing matching nodes in the case of a node failure, or if it is determined that the efficiency of the system can be improved by combining the loads of two different nodes.

A bootstrapper 156 is used to initialize a new matching node 150 that is being added to the cloud. As explained above, a multi-dimensional subscription space partitioning technique may be employed to map an attribute across multiple matching nodes 150 by assigning each matching node 150 to a particular range associated with an attribute. Thus, when initializing a new node, the bootstrapper 156 may be responsible for assigning the node to a particular range associated with a dimension or attribute of a subscription.

A one-hop overlay 154 module allows each matching node 150 to maintain a global view of all the nodes in the cloud environment. Each matching node 150 maintains a table which includes an entry for each matching node 150 in the network. Each entry corresponds to information for a particular matching node 150 and includes the contact information (e.g., IP address or port), the segment boundaries (one segment on each dimension assigned to each matching node), and a timestamp (which indicates the last time the matching node 150 updated its network information) associated with the particular matching node 150. This information may be stored as a server map 155 at the one-hop overlay 154 module.

When the state of a matching node 150 changes (e.g., when a node joins or leaves the cloud, when a range assigned to a node changes, when a new attribute is assigned to a node, when the address of node changes, etc.), the node may update its local information stored in the one-hop overlay 154 module and propagate the changes throughout the network via the gossiper 160. In addition, a dispatcher node 140 may periodically pull the contact and segment information stored in the one-hop overlay 154 from a randomly selected matching node 150.

The gossiper 160 employs a gossiping protocol which informs each node of the liveliness, contact information (e.g., ports, IP addresses, etc.) and load information of all other nodes. Hence, the gossiping protocol can also be used to propagate state changes throughout a network and to determine whether certain nodes, or data centers, have failed.

Each node periodically updates its own entry stored in the server map 155 and exchanges information with log(N) (N is the total number of matching nodes 150) number of matching nodes 150 using the gossiper 160. After a few rounds of such exchange, every matching node 150 is guaranteed to receive updated information about all other nodes in the network. If multiple state changes for a single matching node 150 are being propagated throughout the network simultaneously, the one with the latest timestamp is chosen to update the information at the matching nodes 150.

Transmitting state changes throughout a network using the gossiper 160 is advantageous because its effects on network delay are negligible and it can be implemented with very little overhead. Moreover, it also tolerates node or network failures due to the random selection of nodes to gossip with.

While the gossiper 160 may be advantageously employed to provide certain types of updated information, it may be preferred to push data to nodes in certain scenarios. For example, matching nodes 150 may periodically push dynamic workload information to dispatcher nodes 140. This avoids the latency associated with gossiping data, which is more appropriately used for slow-changing information such as segment assignment, rather than faster, more dynamic workload information.

For example, each matching node 150 may periodically calculate its own arrival rate $\lambda^i$, matching rate $\mu^i$, and the queue length $q^i$ for each dimension assigned to the matching node 150. If any of these variables exceed a predetermined threshold (e.g., 10%), the matching node 150 may be configured to push the updated information to all dispatching nodes 140. Such information is not propagated using the gossiper 160 because this type of information changes more frequently.

The matching nodes 150 may push updated information to nodes 140 in other circumstances as well. For example, a matching node 150 which is being added to the system may contact one or more of the dispatcher nodes 150. Based on the workloads of the matching nodes 150, the dispatcher node 140 may select a heavily loaded matching node 150 whose workload should be split with the newly added matching node 150. In this case, the heavily loaded matching node may push the portion of the subscription load that to the new matching node 150.

Moving on to FIG. 4, a block/flow diagram illustrates an exemplary method 400 for processing a subscription. In block 410, a subscriber sends a subscription to a dispatcher node 140. The subscription may specifically identify certain attributes that the subscriber 110 has an interest in, or alternatively, may represent a query or other information which can be used deduce the events which are to be sent to the subscriber 110.

Upon receiving the subscription, the dispatcher node 140 selects at least one matching node from an overlay network to store the subscription (block 420). In preferred embodiments, the dispatcher node 140 employs the multi-dimensional subscription space partitioning approach described above to select a plurality of matching nodes 150 for storing the subscription. The subscription is forwarded to the selected matching nodes for storage in block 430.

When an event is forwarded to one of the matching nodes 150 which stores the subscription, the matching node 150 compares the event (or attributes associated with the event) with the subscription to determine whether the subscription specifies the subscriber's interest in the event (block 440). If the comparison of the event with the subscription indicates that a subscriber 110 is interested in the event, the event is forwarded to the subscriber 110 in block 450.

FIG. 5 is a block/flow diagram illustrating an exemplary method 500 for processing an event. The method begins in block 510 where a publisher 120 sends an event to a dispatcher node 140. Upon reception of the event, the dispatcher node 140 selects at least one matching node from a plurality of candidate matching nodes 150 for processing the event (block 520). The event traverses a single hop at most from a dispatcher node to a matching node before being matched. Not all matching nodes 150 are candidate matching nodes 150. Rather, the candidate matching nodes 150 represent those matching nodes 150 which store the subscription information needed to process the event.

As explained above, a dispatcher node 140 determines which attribute segments include the attribute values of an incoming event. Using the segment assignment information, the dispatcher nodes 140 can then determine which matching nodes 150 are responsible for those attribute segments. The matching nodes 150 which are responsible for storing the subscriptions with attribute value ranges overlapping with those segments comprise a set of candidate matching nodes 150, and one of the candidate matching nodes 150 is selected for processing the event.

As mentioned above, the dispatcher node 140 may use a performance-oriented event forwarding approach to select the matching node 150. The performance-oriented event forwarding technique may select the matching node 150 using different policies. According to a first policy, the candidate matching node 150 with the least number of subscriptions is selected. According to a second policy, the average response time (i.e., where "response time" refers to the time between receiving an event at a matching node 150 and the time it takes to forward the event to subscribers 110) is calculated for all candidate nodes, and the candidate now with the lowest average response time is selected.

According to a third and preferred policy, a predicted response time is calculated for each candidate matching node 150, and the candidate with the lowest predicted matching time is selected. This adaptive policy works as follows. For each dimension $L_i$, a matching node 150 monitors the message queue length $q^i$ and periodically calculates the average message arrival rate $\lambda^i$ and matching rate $\mu^i$ of the past $w$ seconds. The matching node 150 then sends $\lambda^i$, $\mu^i$ and $q^i$ to all dispatcher nodes 140. One or more of the dispatcher nodes 140 estimate the processing time along each dimension for the corresponding candidate matching nodes 150, and the message is forwarded to the matching node 150 with the shortest estimated processing time.

The estimation is based on a linear interpolation between two consecutive updates, assuming that the message arrival and matching rates remain relatively constant between updates. For example, suppose at last update time t', the queue length on a matcher for dimension $L_i$ was $q_{t'}^i$, the message arrival rate was $\lambda_{t'}^i$, and the message matching rate was $\mu_{t'}^i$. The queue length at time t is then calculated as $q_t^i = q_{t'}^i + (\lambda_{t'}^i - \mu_{t'}^i)(t-t')$, where $(\lambda_{t'}^i - \mu_{t'}^i)(t-t')$ is the number of messages that have arrived but are not processed since t'. The time it takes to process the next message is $(q_t+1)/\mu_{t'}^i$, where $q_t^i/\mu_{t'}^i$, is the queuing time and $1/\mu_{t'}^i$, is the matching time. The estimation between two consecutive updates is preferably performed under high message rates since the queuing time can change drastically in the interim period.

Regardless of the particular policy that is employed to select a matching node 150 in block 520, the event is forwarded to the selected matching node 150 in block 530. The matching node 150 which receives the event compares the event (or attributes associated with the event) to the subscriptions stored locally at the node to determine which subscribers 110 are to receive the event (block 540). In block 550, the event is forwarded to any subscribers that have specified an interest in the event via a subscription.

FIG. 6 is a block/flow diagram illustrating an exemplary method 600 for operating a publish/subscribe messaging system in accordance with the present principles. The method begins in block 610 where a dispatcher node 140 receives a subscription from a subscriber 110.

Next, in block 620, the dispatcher node 140 selects a plurality of matching nodes 150 in an overlay network to store the subscription. This may involve application of the multi-dimensional subscription space partitioning technique described above. The subscription is then forwarded to the selected matching nodes 150 (block 630), and the selected matching nodes each store the subscription locally (block 640).

At some later point in time, an event may be posted by a publisher 120 and received at a dispatcher node (block 650). The dispatching node selects one of a plurality of candidate matching nodes 150 to process the event (block 660). The candidate matching nodes represent those matching nodes 150 that were selected for storing the subscription in block 620.

The selected matching node 150 is forwarded the event in block 670. The selected matching node 150 compares the event (or at least one attribute associated with the event) with the subscription information stored locally at the matching node to determine whether any subscribers have specified an interest in the event (block 680). The event is then forwarded to any subscriber 110 which has specified an interest in the event in block 690.

Having described preferred embodiments for an elastic and scalable publish/subscribe system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for operating a publish/subscribe system, comprising:
   receiving, by a dispatching node, subscription information;
   selecting, by a dispatching node, a plurality of matching nodes in an overlay network to store the subscription information on a computer readable storage medium at each of the plurality of matching nodes based on each of the plurality of matching nodes being a single hop from the dispatching node;
   receiving an event at a dispatching node;
   selecting at least one of the matching nodes with the stored subscription information to process the event;
   periodically receiving, by the dispatching node, load information from each of the matching nodes; and
   adding or removing, by the dispatching node, matching nodes from the overlay network, based on the load information.

2. The method of claim 1, wherein selecting a plurality of matching nodes in an overlay network to store the subscription information includes applying a multi-dimensional subscription space partitioning technique to partition each attribute associated with the subscription information into a plurality of subscription space segments, and assigning an entirety of the subscription information to different matching nodes which are each responsible for at least one of the subscription space segments.

3. The method of claim 2, further comprising identifying the subscription space segments that are associated with attribute values of an incoming event using information propagated through gossiping, and identifying a set of candidate matching nodes responsible for the identified subscriptions space segments.

4. The method of claim 1, wherein selecting at least one of the matching nodes with the stored subscription information to process the event includes selecting the matching node with a lowest predicted response time to execute a matching procedure to determine which events are to be transmitted to subscribers.

5. The method of claim 1, further comprising periodically transmitting data associated with a matching node to a predetermined number of randomly selected matching nodes using a gossiping protocol.

6. The method of claim 5, wherein the data indicates a liveliness value, contact information and load information associated with a matching node.

7. A method for operating a publish/subscribe system, comprising:
   receiving, by a dispatching node, subscription information;
   selecting, by the dispatching node, a plurality of matching nodes in an overlay network to store the subscription information on a computer readable storage medium at each of the plurality of matching nodes based on each of the plurality of matching nodes being a single hop from the dispatching node;
   receiving an event at a dispatching node;
   selecting the matching node with a lowest predicted response time to execute a matching procedure for determining which events are to be transmitted to subscribers;
   periodically transmitting data associated with a matching node to a predetermined number of randomly selected matching nodes using a gossiping protocol;
   periodically receiving, by the dispatching node, load information from each of the matching nodes; and
   adding or removing, by the dispatching node, matching nodes from the overlay network, based on the load information.

8. The method of claim 7, wherein selecting a plurality of matching nodes in an overlay network to store the subscription information includes applying a multi-dimensional subscription space partitioning technique to partition each attribute associated with the subscription information into a plurality of subscription space segments.

9. The method of claim 8, further comprising assigning an entirety of the subscription to different matching nodes which are each responsible for at least one of the subscription space segments.

10. The method of claim 8, further comprising identifying the subscription space segments that are associated with attribute values of an incoming event using information propagated through gossiping, and identifying a set of candidate matching nodes responsible for the identified subscriptions space segments.

11. The method of claim 7, wherein the lowest predicted response time is computed based on at least one of: length of an event queue, message rate or match rate.

* * * * *